United States Patent [19]

D'Agostino

[11] Patent Number: 4,620,067
[45] Date of Patent: Oct. 28, 1986

[54] TELEPHONE WALL CADDY

[76] Inventor: Philip L. D'Agostino, 1140 Castlegate Dr., Winston-Salem, N.C. 27103

[21] Appl. No.: 732,557

[22] Filed: May 10, 1985

[51] Int. Cl.⁴ .................... H04M 1/06; H04M 1/04; A47F 7/00
[52] U.S. Cl. .................. 179/146 R; 40/336; 179/178; 248/314
[58] Field of Search ............. 179/146 R, 178, 100 R, 179/100 C; 40/336, 337, 338, 339; 248/314, 558

[56] References Cited

U.S. PATENT DOCUMENTS 2,339,413  1/1944  King ............................ 179/146 R
3,843,166  10/1974 Barone .......................... 40/336
3,845,252  10/1974 Wooters ........................ 179/146 R Primary Examiner—Gene Z. Rubinson
Assistant Examiner—Danita R. Byrd
Attorney, Agent, or Firm—Richard L. Miller

[57] ABSTRACT

A telephone wall caddy for a wall telephone that has a wall plate and a receiver is provided. The caddy consists of a flat base member that has a cut out area which fits around the wall plate so that when the telephone is attached to the wall plate the flat base member will be held in position. A rest box that has an arc-shaped cut out area will accommodate the receiver. The rest box is adjustable mounted to the flat base member whereby the rest box can be turned upside down so the caddy can be changed from a right-sided to a left-sided model.

6 Claims, 7 Drawing Figures

U.S. Patent  Oct. 28, 1986  4,620,067
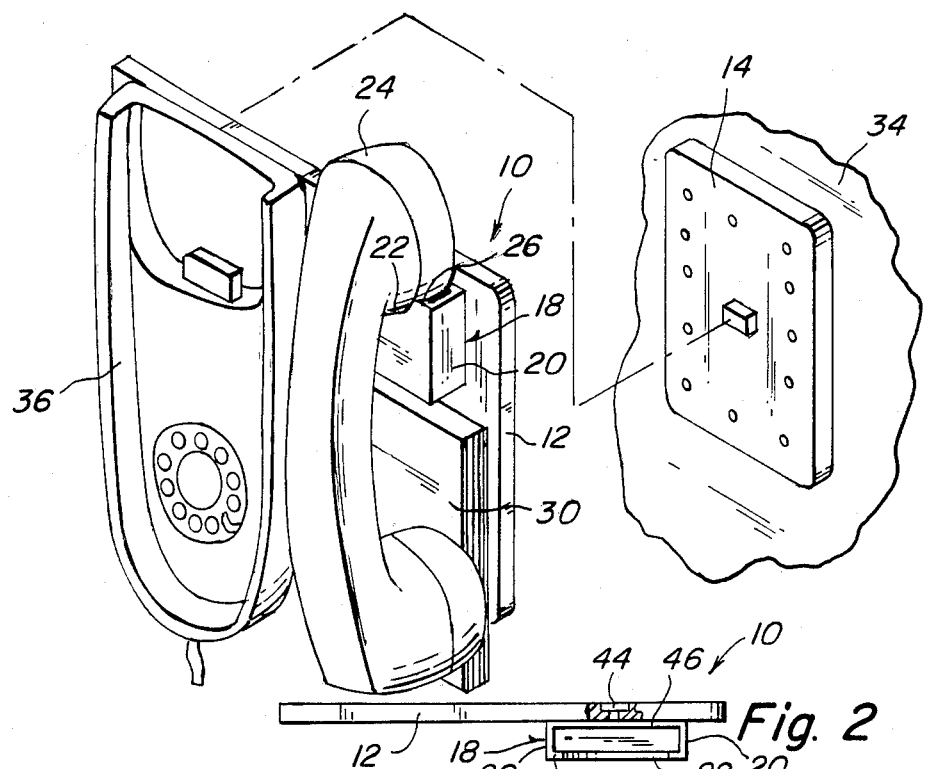
Fig. 1
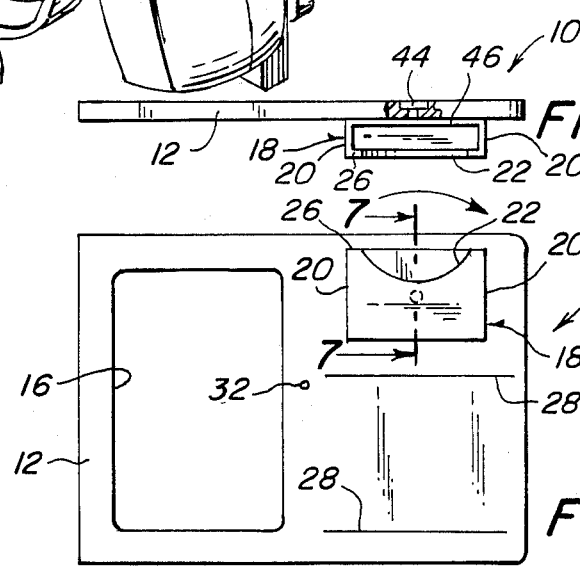
Fig. 2
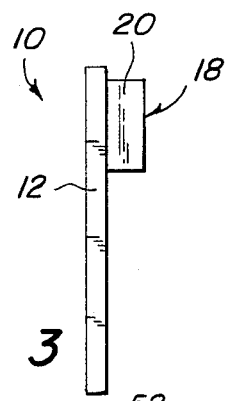
Fig. 3
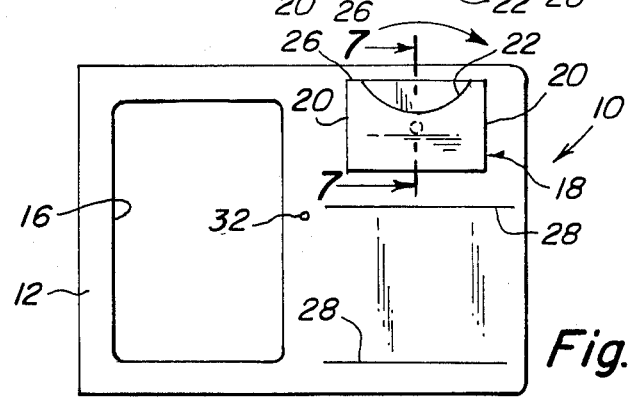
Fig. 4
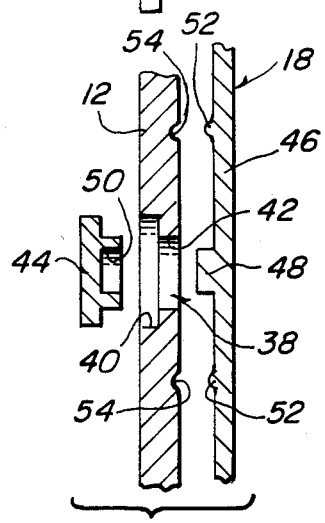
Fig. 7
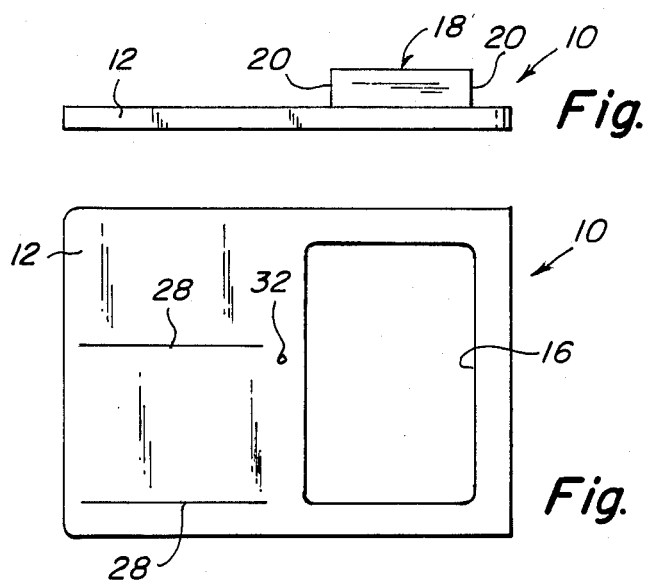
Fig. 5
Fig. 6

TELEPHONE WALL CADDY

BACKGROUND OF THE INVENTION

The instant invention relates generally to attachments for wall mounted telephones and more specifically it relates to a telephone wall caddy.

Since the first wall mounted telephone was installed in that first kitchen, there has remained a rather unique problem with which we have all become familiar. What do you do with the receiver when the call is not for you? Actually, this question arises under numerous circumstances. Such as when you have to leave the immediate area to get a pencil or paper, or you have to find that note or item the caller is asking about. These are just a few instances when you are faced with the dilemma of where to put the receiver.

In offices the solution was to have a "hold" button. But adding such a feature to the millions of existing wall phones would be expensive and difficult, if not impossible. So, we have all learned to improvise. But, how many times have we had to apologize for that horrific smash in the caller's ear when the receiver just did not stay on the table or balanced on the back of a chair?!

The idea of a wall caddy is not new. There have been a few attempts to satisfy this need by legitimate companies such as Rubbermaid and others. But there has always been some overwhelming flaw in the design which has prevented general acceptance. For example, the Rubbermaid version was big and bulky. It surrounded the phone and holes had to be drilled for installation. Others have also been designed with the same or similar features and have not caught on.

Numerous attachments for wall mounted telephones have been provided in prior art that are adopted to be secured thereto. For example, U.S. Pat. Nos. 3,085,134; 3,843,166; and U.S. Pat. No. Des. 248,102 all are illustrative of such prior art while these units may be suitable for the particular purpose to which they address, they would not be as suitable for the purpose of the present invention as heretofore described.

SUMMARY OF THE INVENTION

A principle object of the present invention is to provide a telephone wall caddy that has an adjustable rest box for a telephone receiver whereby the rest box can be turned upside down so the entire caddy can be changed from a right-sided model to a left-sided model.

Another object is to provide a telephone wall caddy that is small and attractive to the eye and can hold a pad and a pencil.

An additional object is to provide a telephone wall caddy that can accommodate both standard and trimline telephones.

A further object is to provide a telephone wall caddy that is economical in cost to manufacture.

A still further object is to provide a telephone wall caddy that is simple and easy to install.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the invention with a typical telephone illustrated thereon.

FIG. 2 is a top elevational view of the invention per se that is with the telephone removed.

FIG. 3 is a side elevational thereof.

FIG. 4 is a front elevational view thereof.

FIG. 5 is a bottom elevational view thereof.

FIG. 6 is a rear elevational view thereof.

FIG. 7 is a partial enlarged exploded cross sectional view taken along line 7—7 in FIG. 4.

DETAILED DESCRIPTION OF THE PREFERRED EMBODIMENTS

Turning now descriptively to the drawings, in which similar reference characters denote similar elements throughout the several views, FIGS. 1 through 7 illustrate a telephone wall caddy 10.

The wall caddy 10 includes a flat base member in which fits around a standard modular wall plate 14. This is made possible by the base member 12 having a cut out area 16. A rest box 18 is also provided which includes sides 20, 20 and has an arc-shaped cut out 22 which accommodates a standard telephone receiver 24. On either side of the arc-22 there is a short level portion 26. A slightly sloped ledge (not shown) can be placed behind each portion 26 inside the rest box 18 which allows for the use of a trimline telephone model. The base member 12 also has horizontal slots 28, 28 for a pad of paper 30 and a small hole 32 for a pencil on a cord (not shown) to be hung therefrom.

One of the unique features of the telephone wall caddy 10 is quick installation, the base member 12 cut out area 16 fits around the standard modular wall plate 14. Putting the caddy 10 up on a wall 34 is easy. First lift the telephone 36 off the wall 34. Place the caddy 10 over the plate 14 and slide the phone 36 back in place. No screws holes, glue or measuring is needed. Installation is accomplished in seconds.

If a standard hard-wired telephone is to be used, simply remove the phone and place a template (not shown) in the cut out area 16 of the base member 12 and replace the phone by putting its screws through it and the template, then back into the original holes. Installation may take a little longer. Still no measuring or need for making of new unsightly holes in the wall 34 is required, which may have to be mended at some future date.

FIG. 7 shows an enlarged exploded cross-sectional view of how the rest box 18 is mounted to the base member 12. In the base member 12, there is a mounting hole 38 cut through which has a larger diameter 40 at the rear and a smaller diameter 42 at the front. This allows a placement pin 44 to fit inside the hole 38. The back 46 of the rest box 18 has a small, circular shaped projection 48 which fits into an inner aperture 50 of the placement pin 44. The two can be fused together (e.g., with a cyanoacrylic glue) if so desired. Also, both the projection 48 and the inner aperture 50 of the placement pin 44 could be grooved so as not to allow slipping. This arrangement keeps the rest box 18 snugly adhered to the base member 12 while allowing it to be turned. To prevent the rest box 18 from accidentally turning when in use, four small, round protuberances 52 on the back 46 of the rest box 18 would fit into corresponding depressions 54 on the base member 12.

The unique feature of the Telephone Wall Caddy 10 is the ability to turn the rest box 18 upside down so that the entire apparatus can be changed from a right-sided to a left-sided model with the twist of the wrist. Not only does this feature allow it to be usable with virtually any telephone, the manufacturer need make only one model. This again, keeps production simple, saving valuable plant floor space and the cost of additional molds and machines. Thus, the Telephone Wall Caddy 10, while being small, attractive and affordable, can be used with both modular and hard-wired telephones, standard and trimline styles, and can accommodate both right-sided and left-sided users.

The major obstacles such as bulk, appearance, difficulty of installation and the need to drill unsightly holes are eliminated in the invention. Now anyone who owns a wall mounted telephone can have the convenience of a place to hang the receiver while adding a touch of elegance without the fuss and bother of complicated installation and at a price they can afford.

The telephone wall caddy 10 can be fabricated out of wood, metal, smoked acrylic or other durable materials.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A telephone wall caddy for a wall telephone having a wall plate and a receiver, said caddy comprises:
   (a) a flat base member having a cut out area which fits around said wall plate so that when said telephone is attached to said wall plate said flat base member will be held in position;
   (b) a rest box having an arc-shaped cut out which will accommodate said receiver; and
   (c) means for adjustably mounting said rest box to said flat base member whereby said rest box can be turned upside down so said caddy can be changed from a right-sided to a left-sided model, wherein said adjustable mounting means includes:
      (i) said base member having a mounting hole therethrough, said mounting hole having a longer diameter at rear and a smaller diameter at front;
      (ii) a placement pin having a larger diameter at rear and a smaller diameter at front, said smaller diameter having an inner aperture, wherein said placement pin fits inside said mounting hole in said base member; and
      (iii) a small circular shaped projection on back of said rest box, said projection fits into said inner aperture of said placement pin so that said rest box is adjustable mounted thereto.

2. A telephone wall caddy as recited in claim 1 wherein said adjustable mounting means further includes:
   (a) said base member having a plurality of depressions formed radially around said mounting hole; and
   (b) said rest box having a plurality of small round protuberances formed radially around said projection on said back, said protuberances fit into said corresponding depressions on said base member so as to prevent said rest box from accidentally turning when in use.

3. A telephone wall caddy as recited in claim 2 further including said base member having a slot for a pad of paper and a small hole for a pencil on a cord to be hung therefrom.

4. A telephone wall caddy as recited in claim 3 fabricated out of wood.

5. A telephone wall caddy as recited in claim 3 fabricated out of metal.

6. A telephone wall caddy as recited in claim 3 fabricated out of plastic.

* * * * *